US012563616B2

(12) United States Patent
Tang et al.

(10) Patent No.: US 12,563,616 B2
(45) Date of Patent: Feb. 24, 2026

(54) PACKET FORWARDING METHOD, APPARATUS, AND SYSTEM

(71) Applicant: Huawei Technologies Co., Ltd., Shenzhen (CN)

(72) Inventors: Feilong Tang, Shanghai (CN); Han Zhou, Shanghai (CN); Hancheng Li, Shanghai (CN); Long Chen, Shanghai (CN); Jiacheng Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 476 days.

(21) Appl. No.: 18/157,580

(22) Filed: Jan. 20, 2023

(65) Prior Publication Data

US 2023/0156833 A1 May 18, 2023

Related U.S. Application Data

(63) Continuation of application No. PCT/CN2021/106798, filed on Jul. 16, 2021.

(30) Foreign Application Priority Data

Jul. 23, 2020 (CN) .......................... 202010718828.6

(51) Int. Cl.
*H04W 76/12* (2018.01)
*H04W 76/11* (2018.01)

(52) U.S. Cl.
CPC ............. *H04W 76/12* (2018.02); *H04W 76/11* (2018.02)

(58) Field of Classification Search
CPC ............................... H04W 76/12; H04W 76/11
See application file for complete search history.

(56) References Cited

U.S. PATENT DOCUMENTS

2018/0324646 A1 11/2018 Lee et al.
2021/0266797 A1 8/2021 Li et al.

FOREIGN PATENT DOCUMENTS

CN 110677345 A * 1/2020 ......... H04L 12/4641
CN 111194058 A 5/2020
(Continued)

OTHER PUBLICATIONS

3GPP TS 23.401 V13.4.0, Sep. 2015, 3rd Generation Partnership Project; Technical Specification Group Services and System Aspects; General Packet Radio Service (GPRS) enhancements for Evolved Universal Terrestrial Radio Access Network (E-UTRAN) access (Release 13), 334 pages.

(Continued)

*Primary Examiner* — Saad A. Waqas
(74) *Attorney, Agent, or Firm* — Conley Rose, P.C.

(57) ABSTRACT

A packet forwarding method includes that a session management network element sends a path identifier to a first device, where the first device includes an access network element corresponding to a protocol data unit (PDU) session and a user plane network element corresponding to the PDU session, the PDU session corresponds to a first terminal, the path identifier indicates a first path from the access network element to the user plane network element, the first path includes a part or all of a second path, and the second path is a path corresponding to a PDU session pre-established by the session management network element for a second terminal. The session management network element further sends, to the first device, identification information of a destination address corresponding to the path identifier.

20 Claims, 5 Drawing Sheets

(56) References Cited

FOREIGN PATENT DOCUMENTS

| WO | WO-2019161240 A1 * | 8/2019 | ........ H04W 36/0027 |
| WO | 2020142884 A1 | 7/2020 | |
| WO | WO-2021136637 A1 * | 7/2021 | ......... H04L 47/2416 |

OTHER PUBLICATIONS

3GPP TS 29.060 V15.5.0, Jun. 2019, 3rd Generation Partnership Project; Technical Specification Group Core Network and Terminals; General Packet Radio Service (GPRS); GPRS Tunnelling Protocol (GTP) across the Gn and Gp interface (Release 15), 194 pages.

3GPP TS 29.244 V16.4.0, Jun. 2020, 3rd Generation Partnership Project; Technical Specification Group Core Network and Terminals; Interface between the Control Plane and the User Plane Nodes; Stage 3 (Release 16), 310 pages.

3GPP TS 29.274 V16.1.0, Sep. 2019, 3rd Generation Partnership Project; Technical Specification Group Core Network and Terminals; 3GPP Evolved Packet System (EPS); Evolved General Packet Radio Service (GPRS) Tunneling Protocol for Control plane (GTPv2-C); Stage 3 (Release 16), 400 pages.

3GPP TS 29.281 V15.2.0, Mar. 2018, 3rd Generation Partnership Project; Technical Specification Group Core Network and Terminals; General Packet Radio System (GPRS) Tunnelling Protocol User Plane (GTPv1-U) (Release 15), 32 pages.

ETSI TS 129 120 V4.0.0, Sep. 2000, Universal Mobile Telecommunications System (UMTS); Mobile Application Part (MAP) specification for Gateway Location Register (GLR); Stage 3 (3GPP TS 29.120 version 4.0.0 Release 4), 157 pages.

* cited by examiner

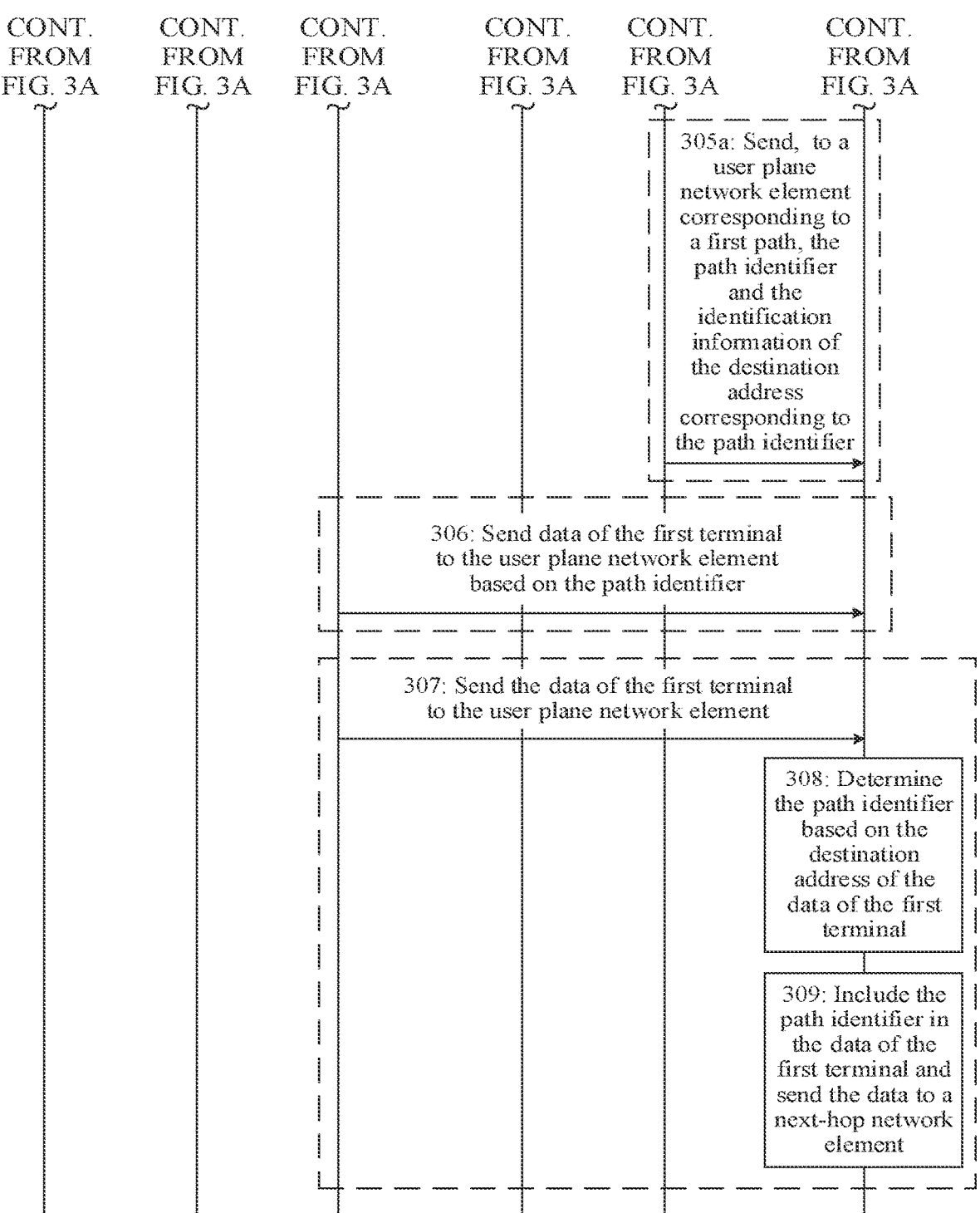

CONT. FROM FIG. 3A    CONT. FROM FIG. 3A    CONT. FROM FIG. 3A    CONT. FROM FIG. 3A    CONT. FROM FIG. 3A    CONT. FROM FIG. 3A

305a: Send, to a user plane network element corresponding to a first path, the path identifier and the identification information of the destination address corresponding to the path identifier 306: Send data of the first terminal to the user plane network element based on the path identifier 307: Send the data of the first terminal to the user plane network element 308: Determine the path identifier based on the destination address of the data of the first terminal 309: Include the path identifier in the data of the first terminal and send the data to a next-hop network element

FIG. 3B

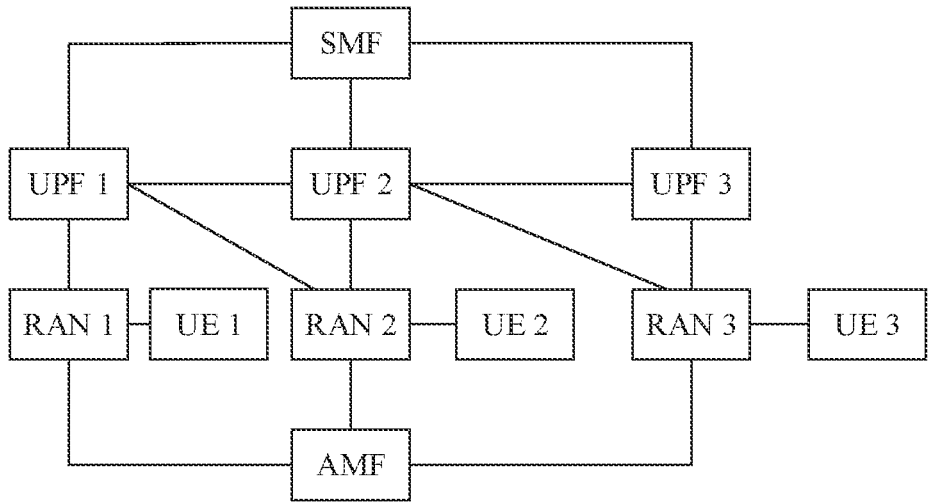
FIG. 4
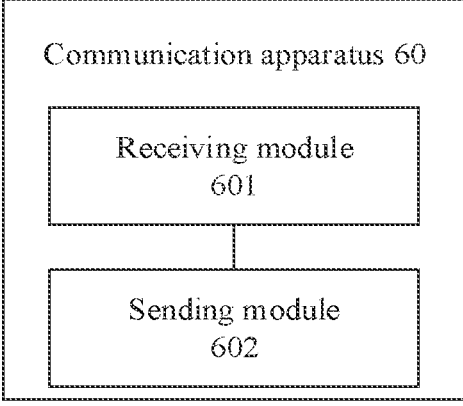
FIG. 5
FIG. 6

PACKET FORWARDING METHOD, APPARATUS, AND SYSTEM

CROSS-REFERENCE TO RELATED APPLICATIONS

This is a continuation of International Patent Application No. PCT/CN2021/106798 filed on Jul. 16, 2021, which claims priority to Chinese Patent Application No. 202010718828.6 filed on Jul. 23, 2020. The disclosures of the aforementioned applications are hereby incorporated by reference in their entireties.

TECHNICAL FIELD

The present disclosure relates to the field of communication technologies, and in particular, to a packet forwarding method, an apparatus, and a system.

BACKGROUND

In a 3rd Generation Partnership Project (3GPP) communication system, a session management network element may establish a protocol data unit (PDU) session for a terminal such that the terminal can send data to a user plane network element via an access network element based on the PDU session. Because the terminal may move continuously in a communication process, when the terminal is handed over from a source access network element to a target access network element, the session management network element may modify the PDU session corresponding to the terminal such that the terminal sends the data to the user plane network element via the target access network element based on a modified PDU session.

When the terminal is handed over from the source access network element to the target access network element, the target access network element may send, to the session management network element via a mobility management network element, a path switch request including a terminal identifier. The session management network element determines, based on the terminal identifier, the PDU session corresponding to the terminal, and determines whether a user plane network element corresponding to the PDU session can continue to serve the terminal. If not, the session management network element may determine an intermediate user plane network element for the terminal, separately send tunnel information of the intermediate user plane network element to the user plane network element and the target access network element, and send tunnel information of the user plane network element and tunnel information of the target access network element to the intermediate user plane network element, to establish an N3 tunnel between the target access network element and the intermediate user plane network element, establish an N9 tunnel between the intermediate user plane network element and the user plane network element, and complete PDU session modification.

When modifying the PDU session, the session management network element needs to exchange, for a plurality of times, tunnel information between the target access network element corresponding to a path that is switched to and each user plane network element, to establish a session tunnel. Consequently, signaling overheads are high, and a switching delay is long.

SUMMARY

In view of this, an objective of this application is to provide a packet forwarding method, an apparatus, and a system, to mitigate existing technical problems of high signaling overheads and a long switching delay when a session management network element modifies a PDU session.

According to a first aspect, an embodiment of this application provides a packet forwarding method. The method includes that a session management network element sends a path identifier to a first device, where the first device includes an access network element corresponding to a PDU session and a user plane network element corresponding to the PDU session, the PDU session corresponds to a first terminal, the path identifier indicates a first path from the access network element to the user plane network element, the first path includes a part or all of a second path, and the second path is a path corresponding to a PDU session pre-established by the session management network element for a second terminal. The session management network element sends, to the first device, identification information of a destination address corresponding to the path identifier, to enable the first device to include, in received data based on the destination address of the data, the path identifier corresponding to the destination address, and forward the data through a path corresponding to the destination address.

Based on the first aspect, when the first path includes the part or all of the second path, the session management network element may send the path identifier to the access network element or the user plane network element, without re-establishing an overlapping part of the first path and the second path. This reduces signaling overheads and shortens a switching delay. In addition, the session management network element may further send a correspondence between the path identifier and the destination address to the first device such that after receiving the data, the first device determines, based on the destination address of the data, the path used to forward the data, includes, in the data, a path identifier corresponding to the path, and sends the data to a next-hop network element.

In a possible design, the first path is a first general packet radio service tunnelling protocol user plane (GTP-U) path, and the second path is a second GTP-U path.

Based on this possible design, the session management network element sends the path identifier to the first device such that when performing data transmission, the first device may include the path identifier in a GTP-U header of the data and send the GTP-U header to the next-hop network element.

In a possible design, the first path includes an intermediate user plane network element.

In a possible design, the path identifier includes a first path identifier and a second path identifier, the first path identifier indicates a path from the access network element to the intermediate user plane network element, and the second path identifier indicates a path from the intermediate user plane network element to the user plane network element.

Based on the foregoing two possible designs, when there is an intermediate user plane network element, the session management network element may send the path identifier to the intermediate user plane network element such that the intermediate user plane network element forwards the data based on the path identifier. Different from a manner in which the intermediate user plane network element establishes different forwarding entries based on different destination addresses of terminal data corresponding to different PDU sessions, in this embodiment of this application, the intermediate user plane network element may directly establish, based on the path identifier, a forwarding entry corresponding to the path identifier. This reduces forwarding entries on the intermediate user plane network element and reduces overheads of the intermediate user plane network element.

In a possible design, the session management network element sends, to the first device, path information corresponding to the path identifier, where the path information includes identification information of the access network element and identification information of the user plane network element that correspond to the first path.

Based on this possible design, the session management network element sends the path information to the first device such that the first device may determine, based on the path information, the access network element and the user plane network element that correspond to the first path. In this way, when forwarding the data, the first device determines the next-hop network element based on the path information.

In a possible design, the path information includes tunnel information of the user plane network element and/or tunnel information of the access network element.

Based on this possible design, when the path information includes the tunnel information of the user plane network element and/or the tunnel information of the access network element, the user plane network element and the access network element may establish a communication connection based on the tunnel information of each other, to facilitate subsequent data transmission.

According to a second aspect, a communication apparatus is provided. The communication apparatus may implement a function performed by the session management network element in the first aspect or the possible design of the first aspect, and the function may be implemented by hardware by executing corresponding software. The hardware or the software includes one or more modules corresponding to the function, for example, a sending module. The sending module is configured to send a path identifier to a first device, where the first device includes an access network element corresponding to a PDU session and a user plane network element corresponding to the PDU session, the PDU session corresponds to a first terminal, the path identifier indicates a first path from the access network element to the user plane network element, the first path includes a part or all of a second path, and the second path is a path corresponding to a PDU session pre-established by the session management network element for a second terminal. The sending module is further configured to send, to the first device, identification information of a destination address corresponding to the path identifier, to enable the first device to include, in received data based on the destination address of the data, the path identifier corresponding to the destination address, and forward the data through a path corresponding to the destination address.

For a specific implementation of the communication apparatus, refer to a behavior and a function of the session management network element in the packet forwarding method provided in any one of the first aspect or the possible designs of the first aspect. Based on the communication apparatus in the second aspect, when the first path includes the part or all of the second path, the session management network element may send the path identifier to the access network element or the user plane network element, without re-establishing an overlapping part of the first path and the second path. This reduces signaling overheads and shortens a switching delay. In addition, the session management network element may further send a correspondence between the path identifier and the destination address to the first device such that after receiving the data, the first device determines, based on the destination address of the data, the path used to forward the data, includes, in the data, a path identifier corresponding to the path, and sends the data to a next-hop network element.

In a possible design, the first path is a first GTP-U path, and the second path is a second GTP-U path.

Based on this possible design, the session management network element sends the path identifier to the first device such that when performing data transmission, the first device may include the path identifier in a GTP-U header of the data and send the GTP-U header to the next-hop network element.

In a possible design, the first path includes an intermediate user plane network element.

In a possible design, the path identifier includes a first path identifier and a second path identifier, the first path identifier indicates a path from the access network element to the intermediate user plane network element, and the second path identifier indicates a path from the intermediate user plane network element to the user plane network element.

Based on the foregoing two possible designs, when there is an intermediate user plane network element, the session management network element may send the path identifier to the intermediate user plane network element such that the intermediate user plane network element forwards the data based on the path identifier. Different from a manner in which the intermediate user plane network element establishes different forwarding entries based on different destination addresses of terminal data corresponding to different PDU sessions, in this embodiment of this application, the intermediate user plane network element may directly establish, based on the path identifier, a forwarding entry corresponding to the path identifier. This reduces forwarding entries on the intermediate user plane network element and reduces overheads of the intermediate user plane network element.

In a possible design, the sending module is further configured to send, to the first device, path information corresponding to the path identifier, where the path information includes identification information of the access network element and identification information of the user plane network element that correspond to the first path.

Based on this possible design, the session management network element sends the path information to the first device such that the first device may determine, based on the path information, the access network element and the user plane network element that correspond to the first path. In this way, when forwarding the data, the first device determines the next-hop network element based on the path information.

In a possible design, the path information includes tunnel information of the user plane network element and/or tunnel information of the access network element.

Based on this possible design, when the path information includes the tunnel information of the user plane network element and/or the tunnel information of the access network element, the user plane network element and the access network element may establish a communication connection based on the tunnel information of each other, to facilitate subsequent data transmission.

According to a third aspect, a communication apparatus is provided. The communication apparatus may be a session management network element, or a chip or a system on chip in the session management network element. The communication apparatus may implement a function performed by the session management network element in the foregoing aspects or the possible designs, and the function may be implemented by hardware. In a possible design, the communication apparatus may include a transceiver. The transceiver may be configured to support the communication apparatus in implementing the function in any one of the first aspect or the possible designs of the first aspect. For example, the transceiver may be configured to send a path identifier to a first device, where the first device includes an access network element corresponding to a PDU session and a user plane network element corresponding to the PDU session, the PDU session corresponds to a first terminal, the path identifier indicates a first path from the access network element to the user plane network element, the first path includes a part or all of a second path, and the second path is a path corresponding to a PDU session pre-established by the session management network element for a second terminal. The transceiver may be further configured to send, to the first device, identification information of a destination address corresponding to the path identifier, to enable the first device to include, in received data based on the destination address of the data, the path identifier corresponding to the destination address, and forward the data through a path corresponding to the destination address. In another possible design, the communication apparatus may further include a memory. The memory is configured to store computer-executable instructions and data that are necessary for the communication apparatus. When the communication apparatus runs, the transceiver executes the computer-executable instructions stored in the memory, to enable the communication apparatus to perform the packet forwarding method according to any one of the first aspect or the possible designs of the first aspect.

For a specific implementation of the communication apparatus, refer to a behavior and a function of the session management network element in the packet forwarding method provided in any one of the first aspect or the possible designs of the first aspect.

According to a fourth aspect, a communication apparatus is provided. The communication apparatus includes one or more processors and one or more memories. The one or more memories are coupled to the one or more processors, and the one or more memories are configured to store computer program code or computer instructions. When the one or more processors execute the computer instructions, the communication apparatus is enabled to perform the packet forwarding method according to any one of the first aspect or the possible designs of the first aspect.

According to a fifth aspect, a computer-readable storage medium is provided. The computer-readable storage medium stores computer instructions or a program. When the computer instructions or the program are/is run on a computer, the computer is enabled to perform the packet forwarding method according to any one of the first aspect or the possible designs of the first aspect.

According to a sixth aspect, a computer program product including instructions is provided. When the computer program product runs on a computer, the computer is enabled to perform the packet forwarding method according to any one of the first aspect or the possible designs of the first aspect.

According to a seventh aspect, a chip system is provided. The chip system includes one or more processors and one or more memories. The one or more memories are coupled to the one or more processors, and the one or more memories store computer program code or computer instructions. When the one or more processors execute the computer program code or the computer instructions, the chip system is enabled to perform the packet forwarding method according to any one of the first aspect or the possible designs of the first aspect.

For technical effects achieved by any one of the design manners of the third aspect to the seventh aspect, refer to the technical effects achieved by any one of the possible designs of the first aspect and the second aspect. Details are not described again.

According to an eighth aspect, an embodiment of this application provides a packet forwarding method. The method includes that a first device receives a path identifier from a session management network element, where the first device includes an access network element corresponding to a protocol data unit PDU session and a user plane network element corresponding to the PDU session, the PDU session corresponds to a first terminal, the path identifier indicates a first path from the access network element to the user plane network element, the first path includes a part or all of a second path, and the second path is a path corresponding to a PDU session pre-established by the session management network element for a second terminal. The first device receives, from the session management network element, identification information of a destination address corresponding to the path identifier. The first device obtains data that is of the first terminal and that includes the destination address. The first device includes, in the data based on the destination address of the data, the path identifier corresponding to the destination address, and forwards the data through a path corresponding to the destination address.

Based on the eighth aspect, when the first path includes the part or all of the second path, the first device may receive the path identifier from the session management network element, without re-establishing an overlapping part of the first path and the second path. This reduces signaling overheads and shortens a switching delay. In addition, the first device receives a correspondence between the path identifier and the destination address such that after receiving the data, the first device may determine, based on the destination address of the data, the path used to forward the data, include, in the data, a path identifier corresponding to the path, and send the data to a next-hop network element.

In a possible design, the first path is a first GTP-U path, and the second path is a second GTP-U path.

Based on this possible design, when performing data transmission, the first device may include the path identifier in a GTP-U header of the data and send the GTP-U header to the next-hop network element.

In a possible design, the first path includes an intermediate user plane network element.

In a possible design, the path identifier includes a first path identifier and a second path identifier, the first path identifier indicates a path from the access network element to the intermediate user plane network element, and the second path identifier indicates a path from the intermediate user plane network element to the user plane network element.

Based on the foregoing two possible designs, when there is an intermediate user plane network element, the intermediate user plane network element may forward the data based on the path identifier. Different from a manner in which the intermediate user plane network element establishes different forwarding entries based on different destination addresses of terminal data corresponding to different PDU sessions, in this embodiment of this application, the intermediate user plane network element may directly establish, based on the path identifier, a forwarding entry corresponding to the path identifier. This reduces forwarding entries on the intermediate user plane network element and reduces overheads of the intermediate user plane network element.

In a possible design, the first device receives, from the session management network element, path information corresponding to the path identifier, where the path information includes identification information of the access network element and identification information of the user plane network element that correspond to the first path.

Based on this possible design, the first device may determine, based on the path information, the access network element and the user plane network element that correspond to the first path such that when forwarding the data, the first device determines the next-hop network element based on the path information.

In a possible design, the path information includes tunnel information of the user plane network element and/or tunnel information of the access network element.

Based on this possible design, when the path information includes the tunnel information of the user plane network element and/or the tunnel information of the access network element, the user plane network element and the access network element may establish a communication connection based on the tunnel information of each other, to facilitate subsequent data transmission.

According to a ninth aspect, a communication apparatus is provided. The communication apparatus may implement a function performed by the first device in the eighth aspect or the possible design of the eighth aspect, and the function may be implemented by hardware by executing corresponding software. The hardware or the software includes one or more modules corresponding to the function, for example, a receiving module and a sending module. The receiving module is configured to receive a path identifier from a session management network element, where the first device includes an access network element corresponding to a protocol data unit PDU session and a user plane network element corresponding to the PDU session, the PDU session corresponds to a first terminal, the path identifier indicates a first path from the access network element to the user plane network element, the first path includes a part or all of a second path, and the second path is a path corresponding to a PDU session pre-established by the session management network element for a second terminal. The receiving module is further configured to receive, from the session management network element, identification information of a destination address corresponding to the path identifier. The receiving module is further configured to obtain data that is of the first terminal and that includes the destination address. The sending module is configured to include, in the data based on the destination address of the data, the path identifier corresponding to the destination address, and forward the data through a path corresponding to the destination address.

For a specific implementation of the communication apparatus, refer to a behavior and a function of the first device in the packet forwarding method provided in any one of the eighth aspect or the possible designs of the eighth aspect. Based on the communication apparatus in the ninth aspect, when the first path includes the part or all of the second path, the first device may receive the path identifier from the session management network element, without re-establishing an overlapping part of the first path and the second path. This reduces signaling overheads and shortens a switching delay. In addition, the first device receives a correspondence between the path identifier and the destination address such that after receiving the data, the first device may determine, based on the destination address of the data, the path used to forward the data, include, in the data, a path identifier corresponding to the path, and send the data to a next-hop network element.

In a possible design, the first path is a first GTP-U path, and the second path is a second GTP-U path.

Based on this possible design, when performing data transmission, the first device may include the path identifier in a GTP-U header of the data and send the GTP-U header to the next-hop network element.

In a possible design, the first path includes an intermediate user plane network element.

In a possible design, the path identifier includes a first path identifier and a second path identifier, the first path identifier indicates a path from the access network element to the intermediate user plane network element, and the second path identifier indicates a path from the intermediate user plane network element to the user plane network element.

Based on the foregoing two possible designs, when there is an intermediate user plane network element, the intermediate user plane network element may forward the data based on the path identifier. Different from a manner in which the intermediate user plane network element establishes different forwarding entries based on different destination addresses of terminal data corresponding to different PDU sessions, in this embodiment of this application, the intermediate user plane network element may directly establish, based on the path identifier, a forwarding entry corresponding to the path identifier. This reduces forwarding entries on the intermediate user plane network element and reduces overheads of the intermediate user plane network element.

In a possible design, the receiving module is further configured to receive, from the session management network element, path information corresponding to the path identifier, where the path information includes identification information of the access network element and identification information of the user plane network element that correspond to the first path.

Based on this possible design, the first device may determine, based on the path information, the access network element and the user plane network element that correspond to the first path such that when forwarding the data, the first device determines the next-hop network element based on the path information.

In a possible design, the path information includes tunnel information of the user plane network element and/or tunnel information of the access network element.

Based on this possible design, when the path information includes the tunnel information of the user plane network element and/or the tunnel information of the access network element, the user plane network element and the access network element may establish a communication connection based on the tunnel information of each other, to facilitate subsequent data transmission.

According to a tenth aspect, a communication apparatus is provided. The communication apparatus may be a first device, or a chip or a system on chip in the first device. The communication apparatus may implement a function performed by the first device in the foregoing aspects or the possible designs, and the function may be implemented by hardware. In a possible design, the communication apparatus may include a transceiver. The transceiver may be configured to support the communication apparatus in implementing the function in any one of the eighth aspect or the possible designs of the eighth aspect. For example, the transceiver may be configured to receive a path identifier from a session management network element, where the first device includes an access network element corresponding to a protocol data unit PDU session and a user plane network element corresponding to the PDU session, the PDU session corresponds to a first terminal, the path identifier indicates a first path from the access network element to the user plane network element, the first path includes a part or all of a second path, and the second path is a path corresponding to a PDU session pre-established by the session management network element for a second terminal. The transceiver may be further configured to receive, from the session management network element, identification information of a destination address corresponding to the path identifier. The transceiver may be further configured to obtain data that is of the first terminal and that includes the destination address. The transceiver may be further configured to include, in the data based on the destination address of the data, the path identifier corresponding to the destination address, and forward the data through a path corresponding to the destination address. In another possible design, the communication apparatus may further include a memory. The memory is configured to store computer-executable instructions and data that are necessary for the communication apparatus. When the communication apparatus runs, the transceiver executes the computer-executable instructions stored in the memory, to enable the communication apparatus to perform the packet forwarding method according to any one of the eighth aspect or the possible designs of the eighth aspect.

For a specific implementation of the communication apparatus, refer to a behavior and a function of the first device in the packet forwarding method provided in any one of the eighth aspect or the possible designs of the eighth aspect.

According to an eleventh aspect, a communication apparatus is provided. The communication apparatus includes one or more processors and one or more memories. The one or more memories are coupled to the one or more processors, and the one or more memories are configured to store computer program code or computer instructions. When the one or more processors execute the computer instructions, the communication apparatus is enabled to perform the packet forwarding method according to any one of the eighth aspect or the possible designs of the eighth aspect.

According to a twelfth aspect, a computer-readable storage medium is provided. The computer-readable storage medium stores computer instructions or a program. When the computer instructions or the program are/is run on a computer, the computer is enabled to perform the packet forwarding method according to any one of the eighth aspect or the possible designs of the eighth aspect.

According to a thirteenth aspect, a computer program product including instructions is provided. When the computer program product runs on a computer, the computer is enabled to perform the packet forwarding method according to any one of the eighth aspect or the possible designs of the eighth aspect.

According to a fourteenth aspect, a chip system is provided. The chip system includes one or more processors and one or more memories. The one or more memories are coupled to the one or more processors, and the one or more memories store computer program code or computer instructions. When the one or more processors execute the computer program code or the computer instructions, the chip system is enabled to perform the packet forwarding method according to any one of the eighth aspect or the possible designs of the eighth aspect.

For technical effects achieved by any one of the design manners of the tenth aspect to the fourteenth aspect, refer to the technical effects achieved by any one of the possible designs of the eighth aspect and the ninth aspect. Details are not described again.

According to a fifteenth aspect, a communication system is provided. The communication system includes the communication apparatus according to either of the second aspect and the third aspect and the communication apparatus according to either of the eighth aspect and the ninth aspect.

BRIEF DESCRIPTION OF DRAWINGS

FIG. 3A and FIG. 3B are a flowchart of a packet forwarding method according to an embodiment of this application;

FIG. 4 is a simplified schematic diagram of a communication system according to an embodiment of this application;

FIG. 5 is a schematic diagram of composition of a communication apparatus according to an embodiment of this application; and FIG. 6 is a schematic diagram of composition of a communication apparatus according to an embodiment of this application.

DESCRIPTION OF EMBODIMENTS

Figure 1A:
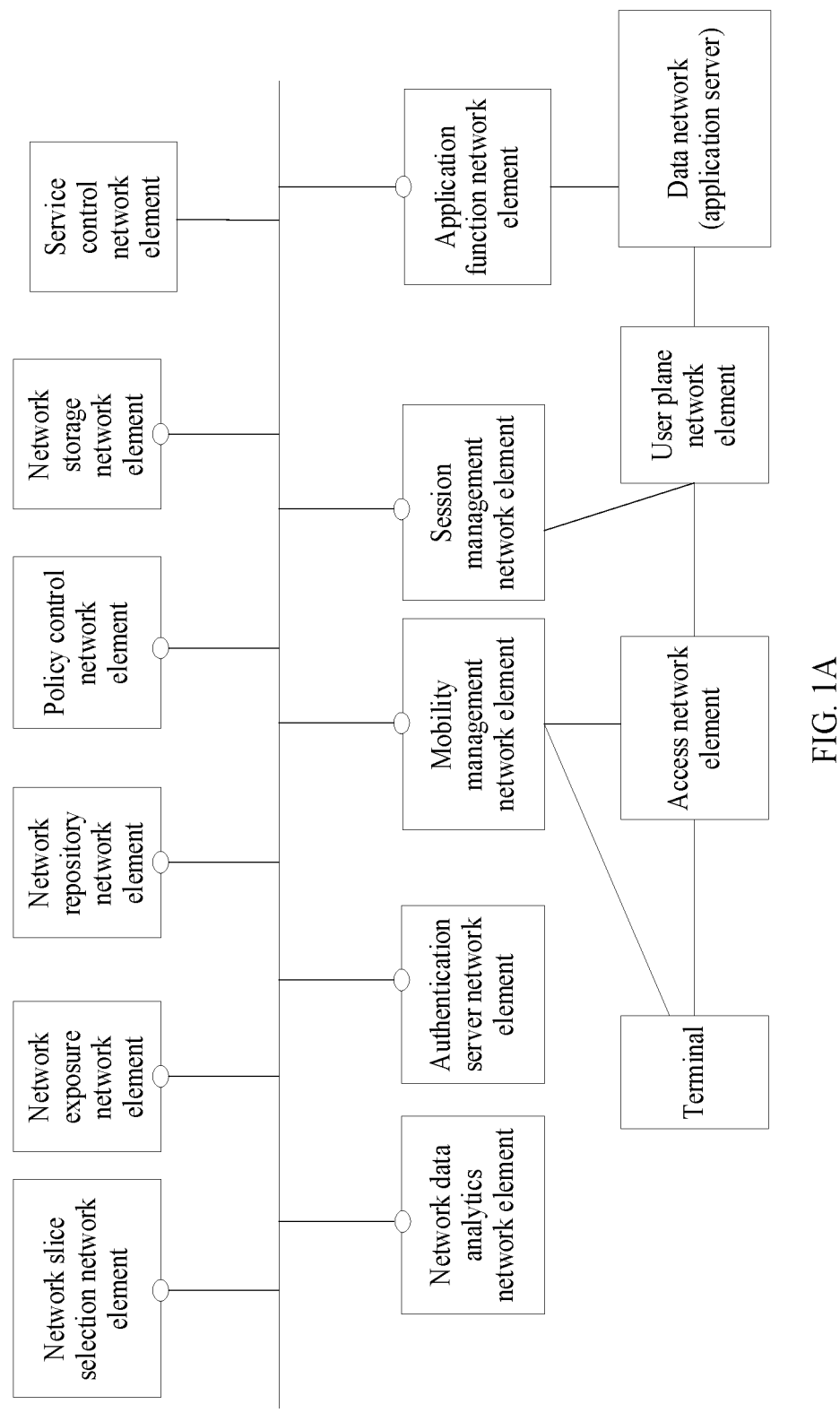
FIG. 1A is a simplified schematic diagram of a communication system according to an embodiment of this application.

Before embodiments of this application are described, terms used in embodiments of this application are described as follows.

APDU session is a transmission path (which is also referred to as a transmission tunnel) used to transmit data to a terminal. The PDU session may include a transmission path from a data network to a core network element (for example, a user plane network element) to an access network element, and an air interface resource that is allocated by the access network element and that is used to send data to a specific terminal. After receiving data transmitted in a PDU session, the access network element may send, on an air interface, the data to a terminal corresponding to the PDU session in a point-to-point (PTP) unicast manner. One PDU session is oriented to one terminal, the PDU session is at a user equipment (UE) level, and one terminal corresponds to one or more PDU sessions.

A specific procedure in which a session management network element establishes a PDU session for a terminal includes the following steps.

Step 101: The terminal sends a session establishment request to a mobility management network element via an access network element. Correspondingly, the mobility management network element receives the session establishment request.

The session establishment request is used to request to establish a PDU session corresponding to the terminal.

Optionally, the terminal further sends identification information of the PDU session to the mobility management network element via the access network element, where the identification information of the PDU session is used to identify the PDU session.

Optionally, the session establishment request and the identification information of the PDU session are carried in a non-access stratum (NAS) message to be sent to the mobility management network element.

Optionally, the terminal further sends location information of the terminal to the mobility management network element via the access network element.

Step 102: The mobility management network element sends a session context create request message to the session management network element. Correspondingly, the session management network element receives the session context create request message.

The session context create request message may include identification information of the terminal, the identification information of the PDU session, and the session establishment request.

Optionally, the session context create request message further includes the location information of the terminal.

Step 103: The session management network element sends a policy creation request to a policy control network element. Correspondingly, the policy control network element receives the policy creation request.

The policy creation request may include the identification information of the terminal and the identification information of the PDU session.

Step 104: The policy control network element sends a response to the policy creation request to the session management network element. Correspondingly, the session management network element receives the response to the policy creation request.

The response to the policy creation request may include identification information of a service corresponding to the terminal, a quality of service (QoS) parameter or a priority corresponding to the service, or the like. The QoS parameter may be a bandwidth, a delay, or the like.

Step 105: The session management network element sends an N4 session establishment request to a user plane network element. Correspondingly, the user plane network element receives the N4 session establishment request.

Optionally, the session management network element determines, for the terminal based on the location information of the terminal, the user plane network element corresponding to the PDU session.

Step 106: The user plane network element sends a response to the N4 session establishment request to the session management network element. Correspondingly, the session management network element receives the response to the N4 session establishment request.

The response to the N4 session establishment request includes tunnel information of the user plane network element.

Step 107: The session management network element sends an N1N2 information transfer message to the mobility management network element. Correspondingly, the mobility management network element receives the N1N2 information transfer message.

The N1N2 information transfer message is Namf_Communication_N1N2Message Transfer, the message may include a session identifier, the tunnel information of the user plane network element, and session establishment accept information. The session establishment accept information indicates to accept the session establishment request sent by the terminal.

Step 108: The mobility management network element sends an N2 session request (N2 request) to the access network element. Correspondingly, the access network element receives the N2 session request.

The N2 session request may include the identification information of the PDU session, the tunnel information of the user plane network element, and the session establishment accept information.

Step 109: The access network element sends a wireless connection establishment request to the terminal. Correspondingly, the terminal receives the wireless connection establishment request.

The access network element may allocate, based on the N2 session request, an air interface resource to the PDU session corresponding to the terminal.

Optionally, the wireless connection establishment request may include the session establishment accept information.

Step 110: The access network element sends tunnel information of the access network element to the session management network element via the mobility management network element. Correspondingly, the session management network element receives the tunnel information of the access network element.

Step 111: The session management network element sends an N4 session modification request to the user plane network element. Correspondingly, the user plane network element receives the N4 session modification request.

The N4 session modification request may include the tunnel information of the access network element.

The session management network element sends the tunnel information of the access network element to the user plane network element and sends the tunnel information of the user plane network element to the access network element such that the access network element establishes a session tunnel to the user plane network element to complete a PDU session establishment procedure.

When the terminal moves from a source access network element to a target access network element, the session management network element may modify the PDU session corresponding to the terminal such that the terminal sends data to the user plane network element via the target access network element based on a modified PDU session. However, when modifying the PDU session of the terminal, the session management network element needs to exchange, for a plurality of times, tunnel information between the access network element corresponding to a path that is switched to and each user plane network element, to establish a session tunnel. Consequently, signaling overheads are high, and a switching delay is long.

To resolve the problems, embodiments of this application provide a packet forwarding method. A session management network element may send a path identifier to an access network element or a user plane network element such that the access network element or the user plane network element sends data of a first terminal to a next-hop network element through a first path based on the path identifier. Different from a manner in which the session management network element exchanges, for a plurality of times, tunnel information between an access network element corresponding to a path that is switched to and each user plane network element, to establish a session tunnel, in embodiments of this application, when the first path includes a part or all of a second path, the session management network element may send the path identifier to the access network element or the user plane network element, without re-establishing an overlapping part of the first path and the second path. This reduces signaling overheads and shortens a switching delay. When there is an intermediate user plane network element, different from a manner in which the intermediate user plane network element establishes different forwarding entries based on different destination addresses of terminal data corresponding to different PDU sessions, in embodiments of this application, the intermediate user plane network element may directly establish, based on the path identifier, a forwarding entry corresponding to the path identifier. This reduces forwarding entries on the intermediate user plane network element and reduces overheads of the intermediate user plane network element.

The following describes implementations of embodiments of this application in detail with reference to the accompanying drawings in this specification.

The packet forwarding method provided in embodiments of this application may be used in any communication system. The communication system may be a 3GPP communication system, for example, a Long-Term Evolution (LTE) system; or may be a 5G mobile communication system, a new radio (NR) system, an NR vehicle-to-everything (V2X) system, or another next-generation communication system; or may be a non-3GPP communication system. This is not limited.

The packet forwarding method provided in embodiments of this application may be applied various communication scenarios, for example, may be applied to one or more of the following communication scenarios: enhanced mobile broadband (eMBB), ultra-reliable low-latency communication (URLLC), machine type communication (MTC), massive machine type communications (mMTC), device-to-device (D2D), V2X, vehicle-to-vehicle (V2V), an internet of things (IoT), and the like. FIG. 1A is used as an example below to describe the packet forwarding method provided in embodiments of this application.

FIG. 1A is a schematic diagram of a communication system according to an embodiment of this application. As shown in FIG. 1A, the communication system may include at least one terminal, at least one access network element, a mobility management network element, a session management network element, a policy control network element, a user plane network element, and a data network (DN).

The terminal in FIG. 1A may be located in a cell coverage area of the access network element. The terminal may perform air interface communication with the access network element over an uplink (UL). In a UL direction, the terminal sends data to the access network element, the access network element forwards the received data to a core network element, and the core network element processes the data and sends the processed data to an application server through an N6 interface. In a downlink (DL) direction, the application server sends downlink data to the core network element, the core network element processes the data and sends the processed data to an access network element through an N3 interface, and the access network element processes the data and then sends the processed data to the terminal through an air interface. For example, the terminal sends uplink data to the access network element in the UL direction through a physical uplink shared channel (PUSCH), the access network element forwards the received uplink data to the core network element, and the core network element processes the uplink data and sends the processed uplink data to the application server through the N6 interface. The access network element that forwards the uplink data from the terminal to the core network element and the access network element that forwards the downlink data from the core network element to the terminal may be a same access network element, or may be different access network elements.

Alternatively, the terminal may communicate with the core network element through a specific interface. For example, the terminal may communicate, through an N1 interface, with a mobility management network element in the core network element.

The session management network element may establish a PDU session for the terminal after the terminal accesses a network. The terminal accesses an external data network DN by using the PDU session, and interacts with an application server deployed in the DN. As shown in FIG. 1A, based on different DNs accessed by the terminal, the network may select, based on a network policy, an anchor, namely, a PDU session anchor (PSA) for accessing the DN by using a user plane PDU session, to access an application server through an N6 interface of the PSA. Application servers of a same application may be deployed at a plurality of locations. The network may select, based on an access location of user equipment, a PSA that is close to the user equipment and that can support the user equipment in accessing the DN, to reduce route recurvation and reduce a network delay.

The terminal in FIG. 1A may be referred to UE, a mobile station (MS), a mobile terminal (MT), or the like. Further, the terminal in FIG. 1A may be a mobile phone, a tablet computer, or a computer having a wireless transceiver function. Alternatively, the terminal may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a wireless terminal in a smart home, a vehicle-mounted terminal, a vehicle having a V2V communication capability, an intelligent connected vehicle, an uncrewed aerial vehicle having a UAV-to-UAV (U2U) communication capability, or the like. This is not limited.

The access network element in FIG. 1A may be any device having a wireless transceiver function, and is mainly configured to implement functions such as a radio physical control function, resource scheduling and radio resource management, radio access control, and mobility management. Specifically, the access network element may be a device supporting wired access, or may be a device supporting wireless access. For example, the access network element may be an access network (AN)/radio access network (RAN) device, where the AN/RAN device includes a plurality of 5G-AN/5G-RAN nodes. A 5G-AN/5G-RAN node may be an access point (AP), a NodeB (NB), an enhanced NodeB (eNB), a next-generation NodeB (gNB), a transmission reception point (TRP), a transmission point (TP), another access node, or the like.

The mobility management network element in FIG. 1A is mainly responsible for work such as access authentication and mobility management of the user equipment, and signaling exchange between functional network elements, for example, managing a registration status of a user, a connection status of the user, user registration and network access, tracking area update, user authentication during cell handover, and key security.

The session management network element in FIG. 1A may be referred to as a session management function, a multicast/broadcast service management function (MB-SMF), a multicast session management network element, or the like. This is not limited. The session management network element is mainly configured to implement a user plane transmission logical channel, for example, a session management function such as establishment, release, and modification of a PDU session.

The policy control network element in FIG. 1a may be configured to provide a policy, for example, a QoS policy, for the mobility management network element and the session management network element.

The user plane network element in FIG. 1A may be referred to as a PSA, a user plane function, or a multicast/ broadcast user plane function MB-UPF. The user plane network element may be used as an anchor on a user plane transmission logical channel, and is mainly configured to complete functions such as routing and forwarding of user plane data. For example, the user plane network element establishes a channel (namely, the user plane transmission logical channel) to the terminal, forwards a data packet between the terminal and a DN on the channel, and is responsible for data packet filtering, data forwarding, rate control, generation of charging information, and the like for the terminal. A MB service controller has service management functions such as group management, security management, and service announcement.

The data network DN in FIG. 1A may be an operator network that provides a data transmission service for a user, for example, may be an operator network that provides an IP multimedia service (IMS) for the user. An application server (AS) may be deployed in the DN, and the application server may provide the data transmission service for the user.

It should be noted that the terminal, the access network element, and the core network element in embodiments of this application each may be one or more chips, or may be a system on chip (SoC), or the like. FIG. 1a is merely an example diagram, and a quantity of devices included in FIG. 1A is not limited. In addition, the communication system may further include other devices in addition to the devices shown in FIG. 1A. Names of the devices and the links in FIG. 1A are not limited. In addition to the names shown in FIG. 1A, the devices and the links may have other names. In addition to the network elements shown in FIG. 1A, the network shown in FIG. 1A may further include an application function network element, a network slice selection network element, a network repository network element, an authentication server network element, a network storage network element, a network data analytics network element, a network exposure network element, and the like. This is not limited.

Specifically, the communication system shown in FIG. 1A may be a 3GPP communication system, for example, an LTE communication system, a 4th generation (4G) communication system, a 5G communication system or a NR communication system, or may be a non-3GPP communication system. This is not limited.

Figure 1B:
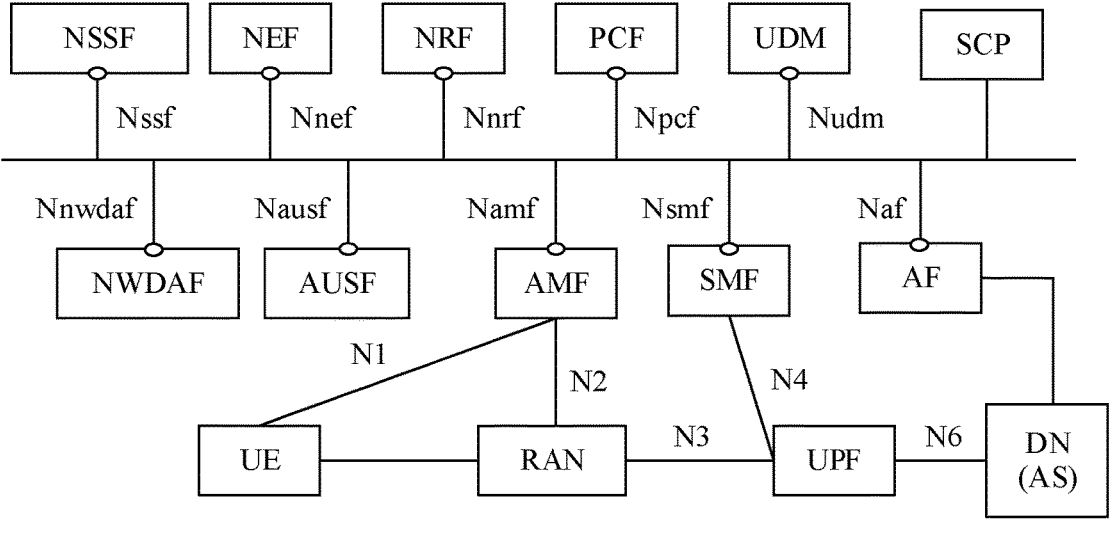
FIG. 1B is a simplified schematic diagram of a fifth generation (5G) communication system according to an embodiment of this application.

For example, the communication system shown in FIG. 1A is a 5G communication system. In FIG. 1B, a network element or an entity corresponding to the access network element may be a radio access network (RAN) in the 5G communication system. A network element or an entity corresponding to the mobility management network element may be an access and mobility management function (AMF) in the 5G communication system. A network element or an entity corresponding to the session management network element may be a session management function (SMF) in the 5G communication system. The policy control network element may be a policy control function (PCF) in the 5G communication system. A network element or an entity corresponding to the user plane network element may be a UPF in the 5G communication system. A network element or an entity corresponding to the application function network element may be an application function (AF) in the 5G communication system. A network element or an entity corresponding to the network slice selection network element may be a network slice selection function (NSSF) in the 5G communication system. A network element or an entity corresponding to the network repository network element may be a network repository function (NRF) in the 5G communication system. A network element or an entity corresponding to the authentication server network element may be an authentication server function (AUSF) in the 5G communication system. A network element or an entity corresponding to the network storage may be an NRF, a unified data repository (UDR), or a unified data management (UDM) in the 5G communication system. A network element or an entity corresponding to the network data analytics network element may be a network data analytics function (NWDAF) in the 5G communication system. A network element or an entity corresponding to the network exposure network element may be a network exposure function (NEF) in the 5G communication system. A network element or an entity corresponding to a service control network element may be a service control point (SCP) in the 5G communication system, and the like.

As shown in FIG. 1B, a terminal communicates with the AMF through a next generation (N) 1 interface (N1), a RAN device communicates with the AMF through an N2 interface (N2), the RAN device communicates with the UPF through an N3 interface (N3), and the UPF communicates with an application server in a DN through an N6 interface. Core network elements may communicate with each other through service-oriented interfaces. For example, the AMF may communicate with another core network element through an Namf interface. The SMF may communicate with another core network element through an Nsmf interface. The PCF may communicate with another core network element through an Npcf interface. The NSSF may communicate with another core network element through an Nnssf interface. The NEF may communicate with another core network element through an Nnef interface. The NRF may communicate with another core network element through an Nnrf interface. The UDM may communicate with another core network element through an Nudr interface. The NWDAF may communicate with another core network element through an Nnwdaf interface. The AUSF may communicate with another core network element through an Nausf interface.

Figure 2:
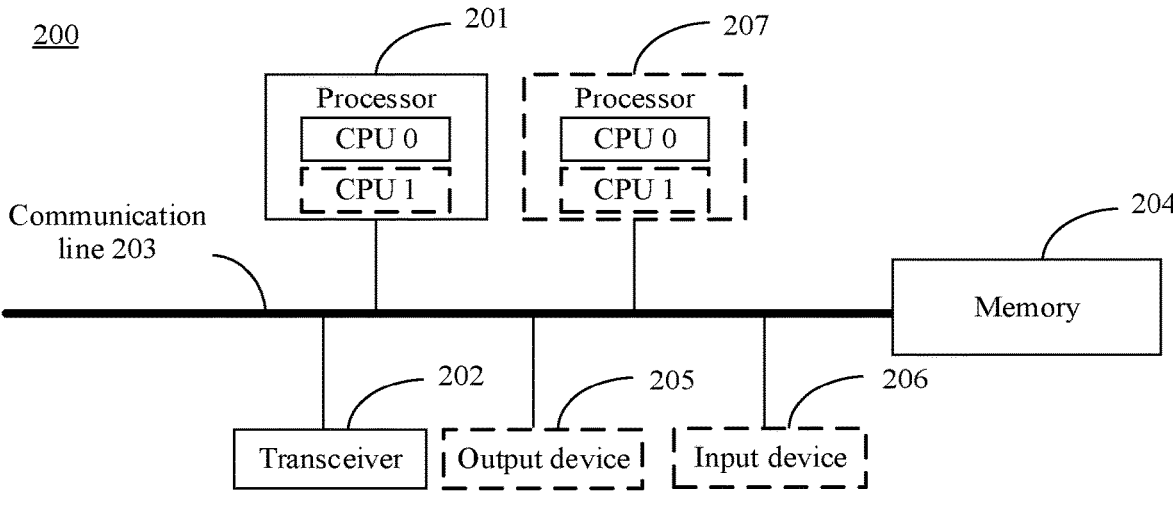
FIG. 2 is a schematic diagram of a structure of a communication apparatus according to an embodiment of this application.

During specific implementation, as shown in FIG. 1A, for example, each terminal, the access network element, and the core network element may use a composition structure shown in FIG. 2, or include components shown in FIG. 2. FIG. 2 is a schematic diagram of composition of a communication apparatus 200 according to an embodiment of this application. The communication apparatus 200 may be a terminal or a chip or a system on chip in the terminal, may be an access network element or a chip or a system on chip in the access network element, or may be a core network element or a chip or a system on chip in the core network element. As shown in FIG. 2, the communication apparatus 200 includes a processor 201, a transceiver 202, and a communication line 203.

Further, the communication apparatus 200 may further include a memory 204. The processor 201, the memory 204, and the transceiver 202 may be connected through the communication line 203.

The processor 201 is a central processing unit (CPU), a general-purpose processor, a network processor (NP), a digital signal processor (DSP), a microprocessor, a micro-controller, a programmable logic device (PLD), or any combination thereof. Alternatively, the processor 201 may be another apparatus having a processing function, for example, a circuit, a component, or a software module. This is not limited.

The transceiver 202 is configured to communicate with another device or another communication network. Another communication network may be an Ethernet, a RAN, a wireless local area network (WLAN), or the like. The transceiver 202 may be a module, a circuit, a transceiver, or any apparatus that can implement communication.

The communication line 203 is configured to transmit information between the components included in the communication apparatus 200.

The memory 204 is configured to store instructions. The instructions may be a computer program.

The memory 204 may be a read-only memory (ROM) or another type of static storage device that can store static information and/or instructions; may be a random-access memory (RAM) or another type of dynamic storage device that can store information and/or instructions; or may be an electrically erasable programmable read-only memory (EE-PROM), a compact disc ROM (CD-ROM) or another compact disc storage, an optical disc storage (including a compact disc, a laser disc, an optical disc, a digital versatile disc, a Blu-ray disc, or the like), a magnetic disk storage medium or another magnetic storage device, or the like. This is not limited.

It should be noted that the memory 204 may be independent of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement a packet forwarding method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device, for example, a keyboard, a mouse, a microphone, or a joystick, and the output device 205 is a device, for example, a display screen, or a speaker.

It should be noted that the communication apparatus 200 may be a desktop computer, a portable computer, a network server, a mobile phone, a tablet computer, a wireless terminal, an embedded device, a chip system, or a device having a structure similar to that in FIG. 2. In addition, the composition structure shown in FIG. 2 does not constitute a limitation on the communication apparatus. In addition to the components shown in FIG. 2, the communication apparatus may include more or fewer components than those shown in the figure, some components may be combined, or different component arrangements may be used.

In embodiments of this application, the chip system may include a chip, or may include a chip and another discrete component.

In addition, actions, terms, and the like in embodiments of this application may be mutually referenced. This is not limited. In embodiments of this application, names of messages exchanged between devices, names of parameters in the messages, or the like are merely examples. Another name may alternatively be used during specific implementation. This is not limited.

The following describes, with reference to the communication system shown in FIG. 1A, the packet forwarding method provided in embodiments of this application. A first terminal may be any terminal in the communication system, a session management network element may be any session management network element in the communication system, a mobility management network element may be any mobility management network element in the communication system, and a user plane network element may be any user plane network element in the communication system. A first terminal, a session management network element, a mobility management network element, a target access network element, and a user plane network element described in the following embodiments may all have the components shown in FIG. 2.

Figure 3A:
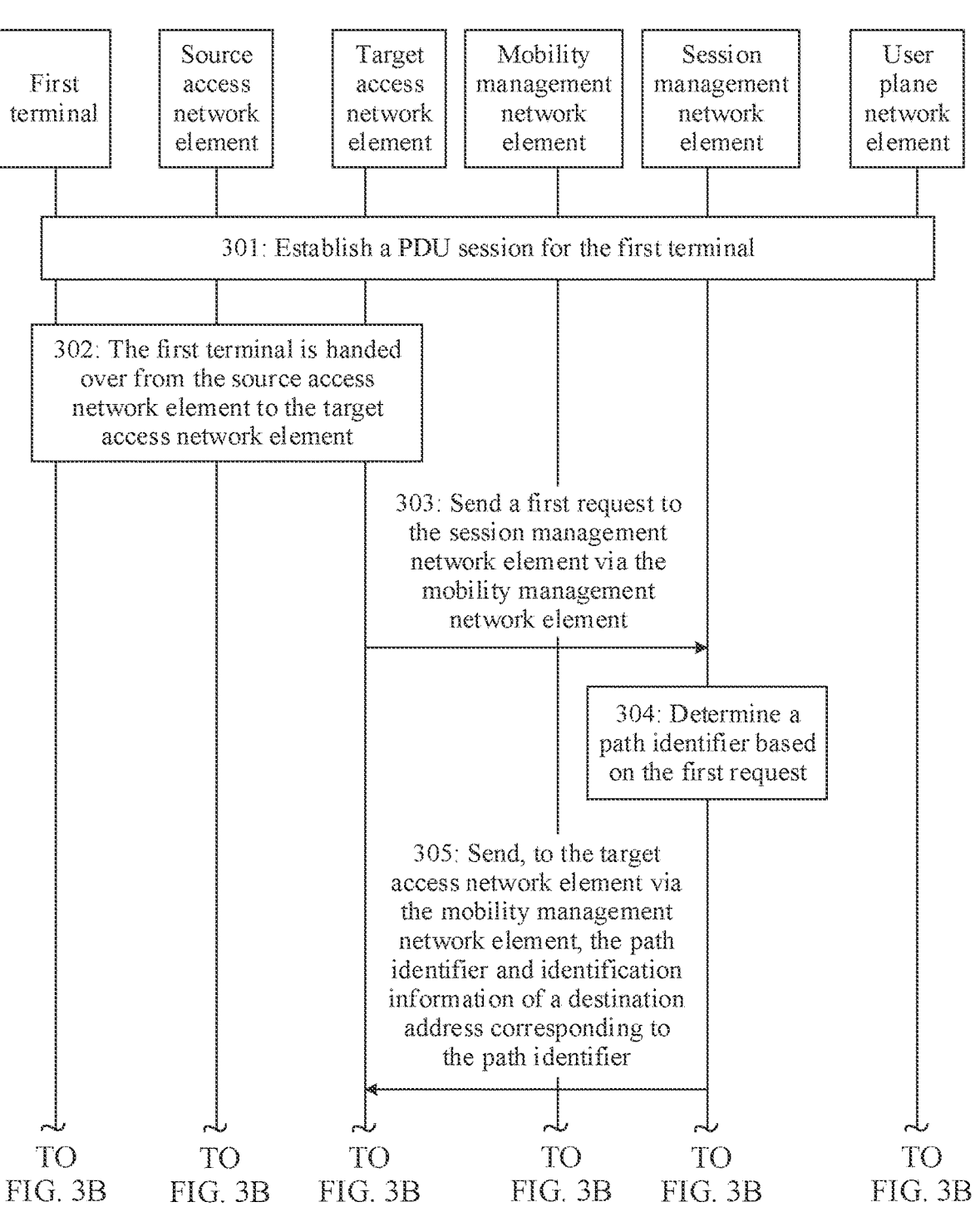

FIG. 3A and FIG. 3B are a flowchart of a packet forwarding method according to an embodiment of this application. As shown in FIG. 3A and FIG. 3B, the method may include the following steps.

Step 301: A session management network element establishes a PDU session for a first terminal.

Further, when the first terminal accesses a network via a source access network element, the session management network element may establish the PDU session for the first terminal with reference to step 101 to step 111 such that when performing data transmission, the first terminal sends data to a user plane network element via the source access network element based on the PDU session.

For example, the first terminal may communicate with an application server in a data network based on the PDU session, the first terminal may send, to the user plane network element based on the PDU session, data whose destination address is the application server, and the user plane network element sends, based on the destination address of the data, the data to the application server corresponding to the destination address. Alternatively, the first terminal may communicate with another terminal in a communication system based on the PDU session. For example, the first terminal communicates with a third terminal. It is assumed that the PDU session established by the session management network element for the first terminal corresponds to a first user plane network element, and a PDU session established by the session management network element for the third terminal corresponds to a third user plane network element. The first terminal may send, to the first user plane network element based on the PDU session, data whose destination address is the third terminal, the first user plane network element forwards the data to the third user plane network element, and the third user plane network element forwards the data to the third terminal by using the PDU session corresponding to the third terminal.

Step 302: The first terminal is handed over from the source access network element to a target access network element.

Further, when the first terminal moves continuously in a communication process, causing the first terminal to be handed over from the source access network element to the target access network element, the source access network element may send, to the target access network element, identification information of the first terminal and identification information of the PDU session corresponding to the first terminal.

It should be noted that, for a process in which the first terminal is handed over from the source access network element to the target access network element, refer to descriptions of handover of a terminal between different access network elements in the conventional technology. Details are not described.

Step 303: The target access network element sends a first request to the session management network element via a mobility management network element.

The first request may include identification information of the target access network element corresponding to the first terminal and the identification information of the PDU session corresponding to the first terminal.

Further, the target access network element may send the first request to the session management network element via the mobility management network element, to notify the session management network element that the first terminal has been handed over to the target access network element and that the PDU session of the first terminal needs to be modified such that the first terminal sends the data to the user plane network element via the target access network element based on a modified PDU session.

Optionally, the target access network element includes the first request in an N2 path switch request, and sends the N2 path switch request to the mobility management network element. After receiving the first request, the mobility management network element includes the first request in a PDU session modification request, and sends the PDU session modification request to the session management network element.

Optionally, the target access network element further sends location information of the first terminal to the session management network element via the mobility management network element.

Step 304: The session management network element determines a path identifier based on the first request.

The path identifier indicates a first path from the target access network element to a user plane network element corresponding to the PDU session, the first path includes a part or all of a second path, and the second path is a path corresponding to a PDU session pre-established by the session management network element for a second terminal. The second path is a path from an access network element corresponding to the PDU session of the second terminal to a user plane network element corresponding to the PDU session of the second terminal. The second terminal may be any terminal other than the first terminal in the communication system.

Further, the session management network element may determine the first path based on the first request, and determine a first path identifier based on the first path.

For example, the session management network element may determine, based on the first request, whether the user plane network element can continue to provide a PDU session service for the first terminal. If yes, the session management network element determines that the first path includes the target access network element and the user plane network element. If not, the session management network element determines an intermediate user plane network element for the first terminal, where the intermediate user plane network element is configured to forward the data of the first terminal from the target access network element to the user plane network element. In this case, the session management network element determines that the first path includes the target access network element, the intermediate user plane network element, and the user plane network element.

Optionally, the session management network element determines the intermediate user plane network element for the first terminal based on the location information of the first terminal.

For example, as shown in FIG. 4, UE 1 is handed over from a RAN 1 to a RAN 2, and a user plane network element corresponding to a PDU session established by a SMF element for the UE 1 is a UPF 1. The SMF may determine, based on location information of the UE1, whether the UPF 1 can continue to provide a PDU session service for the UE 1. If yes, the SMF determines that a first path includes the RAN 2 and the UPF 1. If not, the SMF may determine an intermediate UPF for the UE 1 based on the location information of the UE 1. Assuming that the intermediate UPF determined by the SMF for the UE 1 is a UPF 2, the SMF determines that the first path includes the RAN 2, the UPF 2, and the UPF 1.

For example, the session management network element may determine, based on the determined first path, whether the first path includes the part or all of the second path, and determine the path identifier of the first path based on a determining result.

In a possible design, if the session management network element determines, based on the first path, that the first path includes all of the second path, the session management network element determines the path identifier of the first path based on a path identifier of the second path. That the first path includes all of the second path may be understood as that the first path is the same as the second path, or may be understood as that a part of the first path is the same as the second path.

Further, when the first path is the same as the second path, the session management network element may determine the path identifier of the second path as the path identifier of the first path.

That the first path is the same as the second path may mean that the first path and the second path share a same network element, or may be described as that each network element corresponding to the first path is the same as each network element corresponding to the second path.

For example, as shown in FIG. 4, a second path corresponding to a PDU session established by the session management network element SMF for UE 2 includes the RAN 2 and the UPF 1. Assuming that the SMF determines that the first path corresponding to the UE 1 includes the RAN 2 and the UPF 1, the SMF determines that the first path is the same as the second path, and determines a path identifier of the second path as a path identifier of the first path.

For another example, as shown in FIG. 4, a second path corresponding to a PDU session established by the SMF for UE 2 includes the RAN 2, the UPF 2, and the UPF 1. Assuming that the SMF determines that the first path corresponding to the UE 1 includes the RAN 2, the UPF 2, and the UPF 1, the SMF determines that the first path is the same as the second path, and determines a path identifier of the second path as a path identifier of the first path.

Further, when a part of the first path is the same as the second path, the session management network element may use the path identifier of the second path as a first path identifier of the part of the first path. In addition, the session management network element may further set a second path identifier for the other part of the first path, and use the first path identifier and the second path identifier as the path identifier of the first path.

That a part of the first path is the same as the second path may mean that the part of the first path and the second path share a same network element, or may be described as that the target access network element corresponding to the first path and an access network element corresponding to the second path are a same access network element, and an intermediate user plane network element corresponding to the first path and a user plane network element corresponding to the second path are a same user plane network element. In this case, the session management network element may use identification information of the second path as a first path identifier of a path from the target access network element to the intermediate user plane network element in the first path. The session management network element may further establish a communication connection between the intermediate user plane network element and the user plane network element, set a second path identifier of a path from the intermediate user plane network element to the user plane network element, and use the first path identifier and the second path identifier as the path identifier of the first path.

For example, as shown in FIG. 4, a second path corresponding to a PDU session established by the session management network element SMF for UE 2 includes the RAN 2 and the UPF 2. Assuming that the SMF determines that the first path corresponding to the UE 1 includes the RAN 2, the UPF 2, and the UPF 1, the SMF may determine that a path identifier of the first path includes two parts, where one part is a first path identifier determined based on a path identifier of the second path, and the other part is a second path identifier that is set by the session management network element for a path from the UPF 2 to the UPF 1.

It should be noted that, when establishing the communication connection between the intermediate user plane network element and the user plane network element, the session management network element may exchange identification information of a device between the intermediate user plane network element and the user plane network element, to establish the communication connection between the intermediate user plane network element and the user plane network element based on a device plane. For example, the session management network element may send identification information of the intermediate user plane network element to the user plane network element, and send identification information of the user plane network element to the intermediate user plane network element, to establish the communication connection between the intermediate user plane network element and the user plane network element. The identification information of the device may include information, such as a media access control (MAC) address of the device, an internet protocol (IP) address of the device, and identity (ID) information of the device, used to identify the device.

In another possible design, if the session management network element determines, based on the first path, that the first path includes the part of the second path, the session management network element determines the path identifier of the first path based on a path identifier of the second path. That the first path includes the part of the second path may be understood as that the first path is the same as the part of the second path, or may be understood as that a part of the first path is the same as the part of the second path.

Specifically, when the first path is the same as the part of the second path, the session management network element may determine, as the path identifier of the first path, a path identifier of the part that is the same as the first path in the path identifier of the second path.

That the first path is the same as the part of the second path may mean that the first path and the part of the second path share a same network element, or may be described as that each network element corresponding to the first path is the same as each network element corresponding to the part of the second path.

For example, as shown in FIG. 4, a second path corresponding to a PDU session established by the session management network element SMF for UE 2 includes the RAN 2, the UPF 2, and the UPF 1. Assuming that the SMF determines that the first path corresponding to the UE 1 includes the RAN 2 and the UPF 2, the SMF determines that the first path is the same as a path from the RAN 2 to the UPF 2 in the second path, and determines, as a path identifier of the first path, a path identifier corresponding to the path from the RAN 2 to the UPF 2 in a path identifier of the second path.

Specifically, when the part of the first path is the same as the part of the second path, the session management network element may use, as a first path identifier of the part of the first path, a path identifier of the part of the second path that is the same as the part of the first path. In addition, the session management network element may further set a second path identifier for the other part of the first path, and use the first path identifier and the second path identifier as the path identifier of the first path.

That the part of the first path is the same as the part of the second path may mean that the part of the first path and the part of the second path share a same network element, or may be described as that each network element corresponding to the part of the first path is the same as each network element corresponding to the part of the second path.

For example, as shown in FIG. 4, a second path corresponding to a PDU session established by the session management network element SMF for UE 2 includes the RAN 2, the UPF 2, and the UPF 1. Assuming that the SMF determines that the first path corresponding to the UE 1 includes the RAN 2, the UPF 2, and a UPF 3, the SMF determines that a path from the RAN 2 to the UPF 2 in the first path is the same as a path from the RAN 2 to the UPF 2 in the second path, and determine, as a first path identifier of the first path, a path identifier corresponding to the path from the RAN 2 to the UPF 2 in a path identifier of the second path. The session management network element may further establish a communication connection between the UPF 2 and the UPF 3, set a second path identifier, and use the first path identifier and the second path identifier as a path identifier of the first path.

It should be noted that, for a process in which the session management network element establishes the communication connection between the UPF 2 and the UPF 3, refer to the foregoing process in which the session management network element establishes the communication connection between the intermediate user plane network element and the user plane network element. Details are not described again.

For another example, a second path corresponding to a PDU session established by the session management network element SMF for UE 2 includes the RAN 2, the UPF 2, and the UPF 1. Assuming that the SMF determines that the first path corresponding to the UE 1 includes a RAN 3, the UPF 2, and the UPF 1, the SMF determines a path from the UPF 2 to the UPF 1 in the first path is the same as a path from the UPF 2 to the UPF 1 in the second path, and determines, as a first path identifier of the first path, a path identifier corresponding to the path from the UPF 2 and the UPF 1 in a path identifier of the second path. The session management network element may further establish a communication connection between the RAN 3 and the UPF 2, set a second path identifier, and use the first path identifier and the second path identifier as a path identifier of the first path.

It should be noted that, for a specific process in which the session management network element establishes the communication connection between the RAN 3 and the UPF 2, refer to the foregoing step 105 to step 111. Details are not described again.

In still another possible design, if the session management network element determines, based on the first path, that the first path does not include the part or all of the second path, the session management network element establishes the first path for the first terminal, and sets a path identifier of the first path.

For a specific process in which the session management network element establishes a communication connection between the target access network element and the user plane network element or establishes a communication connection between the target access network element and the intermediate user plane network element when establishing the first path for the first terminal, refer to the foregoing step 105 to step 111. Details are not described again. For establishment of a communication connection between the intermediate user plane network element and the user plane network element, refer to the foregoing process in which the session management network element establishes the communication connection between the intermediate user plane network element and the user plane network element. Details are not described again.

Step 305: The session management network element sends, to the target access network element via the mobility management network element, the path identifier and the identification information of the destination address corresponding to the path identifier.

The session management network element sends the path identifier to the target access network element via the mobility management network element such that after receiving the data of the first terminal, the target access network element may send the data to the user plane network element through the first path corresponding to the path identifier. The session management network element further sends the identification information of the destination address corresponding to the path identifier to the target access network element such that after receiving the data of the first terminal, the target access network element parses the data of the first terminal to obtain the destination address of the data, and determines, based on the destination address of the data, a path used to forward the data.

Optionally, the session management network element further sends, to the target access network element, path information corresponding to the path identifier, where the path information includes identification information of the access network element and identification information of the user plane network element that correspond to the first path. When the first path includes the intermediate user plane network element, the path information further includes the identification information of the intermediate user plane network element.

Optionally, the foregoing step 305 further includes the following step 305a.

Alternatively, the foregoing step 305 may be replaced with the following step 305a.

It should be noted that, when the foregoing step 305 includes the following step 305a, the following step 306 may be performed; or when the foregoing step 305 is replaced with the following step 305a, the following step 307 to step 309 may be performed.

Step 305a: The session management network element sends, to the user plane network element corresponding to the first path, the path identifier and the identification information of the destination address corresponding to the path identifier.

Further, the session management network element sends, to the user plane network element, the identification information of the destination address corresponding to the path identifier such that after receiving the data of the first terminal, the user plane network element parses the data of the first terminal to obtain the destination address of the data, and determines, based on the destination address of the data, the path used to forward the data.

When the first path includes the intermediate user plane network element, the session management network element may further send the path identifier to the intermediate user plane network element.

Optionally, the session management network element sends the path information of the first path to the user plane network element, and when there is an intermediate user plane network element, further sends the path information of the first path to the intermediate user plane network element.

Optionally, the path information further includes tunnel information of the user plane network element and/or tunnel information of the target access network element.

Specifically, when the PDU session of the first terminal corresponds to the target access network element and the user plane network element, refer to the foregoing step 303. If the session management network element has not established a communication connection between the target access network element and the user plane network element before, the session management network element may include the tunnel information of the target access network element in the path information and send the path information to the user plane network element, and include the tunnel information of the user plane network element in the path information and send the path information to the target access network element, to establish the communication connection between the target access network element and the user plane network element.

When there is an intermediate user plane network element, the session management network element may include the tunnel information of the target access network element and the tunnel information of the user plane network element in the path information and send the path information to the intermediate user plane network element, and include tunnel information of the intermediate user plane network element in the path information and separately send the path information to the target access network element and the user plane network element, to establish the communication connection between the target access network element and the intermediate user plane network element and a communication connection between the intermediate user plane network element and the user plane network element.

It should be noted that, if the first path includes the part or all of the second path, the session management network element may not need to send, to the user plane network element and the intermediate user plane network element, path information of a part of the first path that is the same as a part or all of the second path.

Optionally, the session management network element determines the identification information of the first terminal based on the identification information of the PDU session, and sends the identification information of the first terminal to the user plane network element corresponding to the path identifier such that the user plane network element determines, based on the identification information of the first terminal, the data corresponding to the first terminal, to implement an operation such as policy control or charging on the data of the first terminal.

The identification information of the first terminal includes one or more of a MAC address of the first terminal, N4 interface information corresponding to the first terminal, and the like.

It should be noted that, using an example in which the first terminal communicates with the second terminal by using the PDU session, step 305 and/or step 305*a* may alternatively be replaced with the following step 305*b*.

Step 305*b*: The session management network element sends, to the user plane network element or the access network element corresponding to the PDU session of the second terminal, the path identifier and the identification information of the destination address corresponding to the path identifier.

Further, the session management network element may determine a path identifier of a path from the first terminal to the second terminal based on the PDU session of the first terminal and the PDU session of the second terminal, and send the path identifier to the access network element or the user plane network element corresponding to the PDU session of the second terminal. In this way, the access network element or the user plane network element corresponding to the PDU session of the second terminal sends, through the path corresponding to the path identifier, the path identifier to the PDU session corresponding to the first terminal.

For example, as shown in FIG. 4, a path from the UE 1 to the UE 2 sequentially includes the RAN 1, the UPF 1, the UPF 2, and the RAN 2. The session management network element may determine a path identifier based on the path from the UE 1 to the UE 2, and send the path identifier to the RAN 2 such that the RAN 2 sequentially sends the path identifier to the UPF 2, the UPF 1, and the RAN 1 through the path. Alternatively, the session management network element sends the path identifier to the UPF 2 such that the UPF 2 sequentially sends the path identifier to the UPF 1 and the RAN 1 through the path, and sends the path identifier to the RAN 2.

Step 306: The target access network element sends the data of the first terminal to the user plane network element based on the path identifier.

After receiving the data from the first terminal, the target access network element may parse the data of the first terminal to obtain the destination address of the data, determine, based on the destination address, the path identifier corresponding to the first path used to forward the data, and send the data of the first terminal and the path identifier of the first path to a next-hop network element of the target access network element on the first path through the first path.

Specifically, the target access network element may encapsulate the path identifier into a general packet radio service tunnelling protocol for the user plane (general packet radio service tunnelling protocol for the user plane, GTP-U) header corresponding to the data.

In a possible design, when the session management network element sends the path identifier and the path information of the first path to the target access network element via the mobility management network element through the foregoing step 305, the target access network element may include the path identifier of the first path and the path information of the first path in the data of the first terminal, and send the data to the next-hop network element of the target access network element on the first path. The next-hop network element determines a next-hop network element thereof based on the path identifier of the first path, includes the path identifier of the first path and the path information of the first path in the data of the first terminal, and sends the data to the next-hop network element thereof through the first path, until the data of the first terminal is sent to the user plane network element.

It should be noted that, after receiving the data of the first terminal, the user plane network element determines, based on the path identifier of the first path, that the received data is of the first terminal, and may perform a corresponding operation on the data of the first terminal based on a forwarding rule, a charging rule, or the like that is preset for the data of the first terminal.

For example, as shown in FIG. 4, the first path corresponding to the PDU session established by the session management network element for the UE 1 includes the RAN 2, the UPF 2, and the UPF 1. It is assumed that the session management network element sends the path identifier of the first path and path information of the first path to the RAN 2 via a mobility management network element. In this case, the RAN 2 may include the path identifier of the first path and the path information of the first path in data of the UE 1 and send the data to the UPF 2. If the UPF 2 determines, based on the path information of the first path, that a next-hop network element of the UPF 2 on the first path is the UPF 1, the UPF 2 includes the path identifier of the first path and the path information of the first path in the data of the UE 1, and sends the data to the UPF 1. The UPF 1 determines, based on the path identifier of the first path, that the received data is of the UE 1, and may perform a corresponding operation on the data of the UE 1 based on a forwarding rule, a charging rule, or the like that is preset for the data of the UE 1.

In another possible design, when the session management network element sends the path identifier and the path information of the first path to the target access network element, the intermediate user plane network element, and the user plane network element through the foregoing step 305 and step 305*a*, the target access network element may include the path identifier of the first path in the data of the first terminal, and send the data to the next-hop network element of the target access network element on the first path. The next-hop network element determines a next-hop network element thereof from originally stored path information based on the path identifier of the first path, includes the path identifier of the first path in the data of the first terminal, and sends the data to the next-hop network element thereof through the first path, until the data of the first terminal is sent to the user plane network element.

For example, as shown in FIG. 4, the first path established by the session management network element for the UE 1 includes the RAN 2, the UPF 2, and the UPF 1. It is assumed that the session management network element sends the path identifier of the first path and path information of the first path to the RAN 2, the UPF 2, and the UPF 1 through the foregoing step 305 and step 305*a*. In this case, the RAN 2 may include the path identifier of the first path in data of the UE 1 and send the data to the UPF 2. The UPF 2 determines, from prestored path information based on the path identifier of the first path, that a next-hop network element of the UPF 2 on the first path is the UPF 1, includes the path identifier of the first path in the data of the UE 1, and sends the data to the UPF 1. The UPF 1 determines, based on the path identifier of the first path, that the received data is of the UE 1, and may perform a corresponding operation on the data of the UE 1 based on a forwarding rule, a charging rule, or the like that is preset for the data of the UE 1.

Step 307: The target access network element sends the data of the first terminal to the user plane network element. Correspondingly, the user plane network element receives the data of the first terminal.

After receiving the data from the first terminal, the target access network element may directly send the data to the user plane network element without parsing the data of the first terminal.

Step 308: The user plane network element determines the path identifier based on the destination address of the data of the first terminal.

After receiving the data of the first terminal sent by the target access network element, the user plane network element may parse the data of the first terminal to obtain the destination address of the data of the first terminal, and determine the path identifier based on the destination address.

For example, as shown in FIG. 4, the PDU session corresponding to the UE 1 includes the RAN 1 and the UPF 1, and the PDU session corresponding to the UE 2 includes the RAN 2 and the UPF 2. It is assumed that the UPF 1 receives the data of the UE 1 from the RAN 1, and the UPF 1 parses the data and finds that a destination address of the data corresponds to the UE 2. In this case, the UPF 1 may prestore a correspondence between a destination address and a path identifier, to determine a path identifier corresponding to the destination address.

Step 309: The user plane network element includes the path identifier in the data of the first terminal, and sends the data to a next-hop network element.

Further, the user plane network element may encapsulate the path identifier into the GTP-U header of the data.

It should be noted that, after the user plane network element includes the path identifier in the data of the first terminal and sends the data to the next-hop network element, the next-hop network element may determine, based on the foregoing step 308, the path identifier corresponding to the destination address of the received data, include the determined path identifier in the data, and send the data to a next-hop network element thereof, until the data is sent to the destination address.

Based on the method shown in FIG. 3A and FIG. 3B, the session management network element sends the path identifier to the target access network element or the user plane network element such that the target access network element or the user plane network element sends the data of the first terminal to the next-hop network element through the first path based on the path identifier. Different from a manner in which the session management network element exchanges, for a plurality of times, tunnel information between the target access network element corresponding to a path that is switched to and each user plane network element, to establish a session tunnel, in embodiments of this application, when the first path includes the part or all of the second path, the session management network element may send the path identifier to the target access network element or the user plane network element, without re-establishing an overlapping part of the first path and the second path. This reduces signaling overheads and shortens a switching delay. When there is an intermediate user plane network element, different from a manner in which the intermediate user plane network element establishes different forwarding entries based on different destination addresses of terminal data corresponding to different PDU sessions, in embodiments of this application, the intermediate user plane network element may directly establish, based on the path identifier, a forwarding entry corresponding to the path identifier. This reduces forwarding entries on the intermediate user plane network element and reduces overheads of the intermediate user plane network element.

It should be noted that in the method shown in FIG. 3A and FIG. 3B, after the first terminal is handed over from the source access network element to the target access network element, when modifying the PDU session corresponding to the first terminal, the session management network element may send the path identifier of the first path to the target access network element and the user plane network element corresponding to the modified PDU session of the first terminal. Alternatively, when establishing an initial PDU session for the first terminal, the session management network element may send, with reference to the method shown in FIG. 3A and FIG. 3B, the path identifier of the path corresponding to the PDU session of the first terminal to the access network element and the user plane network element corresponding to the PDU session of the first terminal. For an action performed by the access network element corresponding to the PDU session of the first terminal, refer to an action performed by the target access network element in FIG. 3A and FIG. 3B. For an action performed by the user plane network element corresponding to the PDU session of the first terminal, refer to an action performed by the user plane network element in FIG. 3A and FIG. 3B. Details are not described again.

The foregoing mainly describes the solutions provided in embodiments of this application from a perspective of interaction between the devices. It may be understood that to implement the foregoing functions, the devices include hardware structures and/or software modules corresponding to the functions. A person skilled in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the network elements may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely logical function division. During actual implementation, another division manner may be used.

When each functional module is obtained through division based on each corresponding function, FIG. 5 shows a communication apparatus. The communication apparatus 50 may be a session management network element, or a chip or a system on chip in the session management network element. The communication apparatus 50 may be configured to perform a function of the session management network element in the foregoing embodiments. The communication apparatus 50 shown in FIG. 5 includes a sending module 501.

The sending module 501 is configured to send a path identifier to a first device, where the first device includes an access network element corresponding to a PDU session and a user plane network element corresponding to the PDU session, the PDU session corresponds to a first terminal, the path identifier indicates a first path from the access network element to the user plane network element, the first path includes a part or all of a second path, and the second path is a path corresponding to a PDU session pre-established by the session management network element for a second terminal.

The sending module 501 is further configured to send, to the first device, identification information of a destination address corresponding to the path identifier, to enable the first device to include, in received data based on the destination address of the data, the path identifier corresponding to the destination address, and forward the data through a path corresponding to the destination address.

For a specific implementation of the communication apparatus 50, refer to a behavior and a function of the session management network element in the packet forwarding method in FIG. 3A and FIG. 3B.

In a possible design, the first path is a first GTP-U path, and the second path is a second GTP-U path.

In a possible design, the first path includes an intermediate user plane network element.

In a possible design, the path identifier includes a first path identifier and a second path identifier, the first path identifier indicates a path from the access network element to the intermediate user plane network element, and the second path identifier indicates a path from the intermediate user plane network element to the user plane network element.

In a possible design, the sending module 501 is further configured to send, to the first device, path information corresponding to the path identifier, where the path information includes identification information of the access network element and identification information of the user plane network element that correspond to the first path.

In a possible design, the path information includes tunnel information of the user plane network element and/or tunnel information of the access network element.

In another implementation, the sending module 501 in FIG. 5 may be replaced with a transceiver, and a function of the sending module 501 may be integrated into the transceiver. Further, the communication apparatus 50 shown in FIG. 5 may further include a memory. When the sending module 501 is replaced with the transceiver, the communication apparatus 50 in this embodiment of this application may be the communication apparatus shown in FIG. 2.

When each functional module is obtained through division based on each corresponding function, FIG. 6 shows a communication apparatus. The communication apparatus 60 may be a first device, or a chip or a system on chip in the first device. The communication apparatus 60 may be configured to perform a function of the first device in the foregoing embodiments. The communication apparatus 60 shown in FIG. 6 includes a receiving module 601 and a sending module 602.

The receiving module 601 is configured to receive a path identifier from a session management network element, where the first device includes an access network element corresponding to a protocol data unit PDU session and a user plane network element corresponding to the PDU session, the PDU session corresponds to a first terminal, the path identifier indicates a first path from the access network element to the user plane network element, the first path includes a part or all of a second path, and the second path is a path corresponding to a PDU session pre-established by the session management network element for a second terminal.

The receiving module 601 is further configured to receive, from the session management network element, identification information of a destination address corresponding to the path identifier.

The receiving module 601 is further configured to obtain data that is of the first terminal and that includes the destination address.

The sending module 602 is further configured to forward, based on the destination address of the data, the data through a path corresponding to the destination address of the data.

For a specific implementation of the communication apparatus 60, refer to a behavior and a function of the first device in the packet forwarding method in FIG. 3A and FIG. 3B.

In a possible design, the first path is a first GTP-U path, and the second path is a second GTP-U path.

In a possible design, the first path includes an intermediate user plane network element.

In a possible design, the path identifier includes a first path identifier and a second path identifier, the first path identifier indicates a path from the access network element to the intermediate user plane network element, and the second path identifier indicates a path from the intermediate user plane network element to the user plane network element.

In a possible design, the receiving module 601 is further configured to receive, from the session management network element, path information corresponding to the path identifier, where the path information includes identification information of the access network element and identification information of the user plane network element that correspond to the first path.

In a possible design, the path information includes tunnel information of the user plane network element and/or tunnel information of the access network element.

In another implementation, the receiving module 601 in FIG. 6 may be replaced with a transceiver, and a function of the receiving module 601 may be integrated into the transceiver. Further, the communication apparatus 60 shown in FIG. 6 may further include a memory. When the receiving module 601 is replaced with the transceiver, the communication apparatus 60 in this embodiment of this application may be the communication apparatus shown in FIG. 2.

An embodiment of this application further provides a computer-readable storage medium. All or some of the processes in the foregoing method embodiments may be implemented by a computer program instructing related hardware. The program may be stored in the computer-readable storage medium. When the program is executed, the processes of the foregoing method embodiments may be included. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (SMC), a secure digital (SD) card, a flash card, or the like that are equipped on the terminal. Further, the computer-readable storage medium may alternatively include both of the internal storage unit and the external storage device of the terminal. The computer-readable storage medium is configured to store the computer program and other programs and data that are required by the terminal. The computer-readable storage medium may be further configured to temporarily store data that has been output or is to be output.

It should be noted that, in the specification, the claims, and the accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Based on the foregoing descriptions of the implementations, a person skilled in the art may clearly understand that, for the purpose of convenient and brief description, division of the foregoing functional modules is used as an example for description. During actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or the units may be implemented in electronic, mechanical, or other forms.

The units described as separate parts may or may not be physically separate, and parts displayed as units may be one or more physical units, may be located in one place, or may be distributed in different places. Some or all of the units may be selected according to actual requirements to achieve the objectives of the solutions of the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a session management network element, wherein the method comprises:
   sending a first path identifier to a first device, wherein the first device comprises an access network element corresponding to a protocol data unit (PDU) session and a user plane network element corresponding to the PDU session, wherein the PDU session corresponds to a first terminal, wherein the first path identifier indicates a first path from the access network element to the user plane network element, wherein the first path comprises a part or all of a second path, wherein the first path identifier is based on a second path identifier of the second path, and wherein the second path corresponds to a pre-established PDU session for a second terminal; and
   sending, to the first device, identification information of a destination address corresponding to the first path identifier, to enable the first device to incorporate, based on the destination address, the first path identifier in data of the first terminal to obtain incorporate data, and forward the incorporated data through a third path corresponding to the destination address.

2. The method of claim 1, wherein the first path is a first general packet radio service tunnelling protocol user plane (GTP-U) path, and wherein the second path is a second GTP-U path.

3. The method of claim 1, wherein the first path comprises an intermediate user plane network element.

4. The method of claim 3, wherein the first path identifier comprises a third path identifier indicating a fourth path from the access network element to the intermediate user plane network element and a fourth path identifier indicating a fifth path from the intermediate user plane network element to the user plane network element.

5. The method of claim 1, further comprising sending path information corresponding to the first path identifier, wherein the path information comprises first identification information of the access network element and second identification information of the user plane network element that correspond to the first path.

6. The method of claim 5, wherein the path information further comprises first tunnel information of the user plane network element and/or second tunnel information of the access network element.

7. A method implemented by a first device, wherein the method comprises:

receiving a first path identifier from a session management network element, wherein the first device comprises an access network element corresponding to a protocol data unit (PDU) session and a user plane network element corresponding to the PDU session, wherein the PDU session corresponds to a first terminal, wherein the first path identifier indicates a first path from the access network element to the user plane network element, wherein the first path comprises a part or all of a second path, wherein the first path identifier is based on a second path identifier of the second path, and wherein the second path corresponds to a pre-established PDU session for a second terminal;

receiving, from the session management network element, identification information of a destination address corresponding to the first path identifier;

obtaining data of the first terminal, wherein the data comprises the destination address;

incorporating, based on the destination address, the first path identifier in the data to obtain incorporate data; and forwarding the incorporated data through a third path corresponding to the destination address.

8. The method of claim 7, wherein the first path is a first general packet radio service tunnelling protocol user plane (GTP-U) path, and wherein the second path is a second GTP-U path.

9. The method of claim 7, wherein the first path comprises an intermediate user plane network element.

10. The method of claim 9, wherein the first path identifier comprises a third path identifier indicating a fourth path from the access network element to the intermediate user plane network element and a fourth path identifier indicating a fifth path from the intermediate user plane network element to the user plane network element.

11. The method of claim 7, further comprising receiving, from the session management network element, path information corresponding to the first path identifier, wherein the path information comprises first identification information of the access network element and second identification information of the user plane network element that correspond to the first path.

12. The method of claim 11, wherein the path information comprises first tunnel information of the user plane network element and/or second tunnel information of the access network element.

13. A communication apparatus, comprising:

a memory configured to store instructions; and a processor coupled to the memory and configured to:

send a first path identifier to a first device, wherein the first device comprises an access network element corresponding to a protocol data unit (PDU) session or a user plane network element corresponding to the PDU session, wherein the PDU session corresponds to a first terminal, wherein the first path identifier indicates a first path from the access network element to the user plane network element, wherein the first path comprises a part or all of a second path, wherein the first path identifier is based on a second path identifier of the second path, and wherein the second path corresponds to a pre-established PDU session for a second terminal; and send, to the first device, identification information of a destination address corresponding to the first path identifier, to enable the first device to incorporate, based on the destination address, the first path identifier in data of the first terminal to obtain incorporate data, and forward the incorporated data through a third path corresponding to the destination address.

14. The communication apparatus of claim 13, wherein the first path is a first general packet radio service tunnelling protocol user plane (GTP-U) path, and wherein the second path is a second GTP-U path.

15. The communication apparatus of claim 13, wherein the first path comprises an intermediate user plane network element.

16. The communication apparatus of claim 15, wherein the first path identifier comprises a third path identifier and a fourth path identifier, wherein the third path identifier indicates a fourth path from the access network element to the intermediate user plane network element, and wherein the fourth path identifier indicates a fifth path from the intermediate user plane network element to the user plane network element.

17. The communication apparatus of claim 13, wherein the processor is configured to send, to the first device, path information corresponding to the first path identifier, wherein the path information comprises first identification information of the access network element and second identification information of the user plane network element that correspond to the first path.

18. The communication apparatus of claim 17, wherein the path information comprises first tunnel information of the user plane network element and/or second tunnel information of the access network element.

19. A communication apparatus being an access network element corresponding to a protocol data unit (PDU) session; or a user plane network element corresponding to the PDU session, comprising:

a memory configured to store instructions; and a processor coupled to the memory and configured to:

receive a first path identifier from a session management network element, wherein the PDU session corresponds to a first terminal, wherein the first path identifier indicates a first path from the access network element to the user plane network element, wherein the first path comprises a part or all of a second path, wherein the first path identifier is based on a second path identifier of the second path, and wherein the second path corresponds to a pre-established PDU session for a second terminal;

receive, from the session management network element, identification information of a destination address corresponding to the first path identifier;

obtain data of the first terminal, wherein the data comprises the destination address;

incorporate, based on the destination address, the first path identifier in the data to obtain incorporate data; and forward the incorporated data through a third path corresponding to the destination address.

20. The communication apparatus of claim 19, wherein the first path is a first general packet radio service tunnelling protocol user plane (GTP-U) path, and wherein the second path is a second (GTP-U) path.

* * * * *